US012271586B2

(12) United States Patent
Mourkogiannis

(10) Patent No.: US 12,271,586 B2
(45) Date of Patent: Apr. 8, 2025

(54) COMBINING FIRST USER INTERFACE CONTENT INTO SECOND USER INTERFACE

(71) Applicant: Snap Inc., Santa Monica, CA (US)

(72) Inventor: Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/314,704

(22) Filed: May 9, 2023

(65) Prior Publication Data

US 2023/0273723 A1 Aug. 31, 2023

Related U.S. Application Data

(63) Continuation of application No. 17/197,832, filed on Mar. 10, 2021, now Pat. No. 11,675,494.

(Continued)

(51) Int. Cl.
*G06F 3/04883* (2022.01)
*G06F 3/04817* (2022.01)
(Continued)

(52) U.S. Cl.
CPC ........ *G06F 3/0488* (2013.01); *G06F 3/04817* (2013.01); *G06F 3/0482* (2013.01);
(Continued)

(58) Field of Classification Search
CPC ............. G06F 3/04845; G06F 3/04883; G06F 3/04817; G06F 3/0482; G06F 2203/04808;
(Continued)

(56) References Cited

U.S. PATENT DOCUMENTS 7,971,156 B2 6/2011 Albertson et al.
7,996,793 B2 8/2011 Latta et al.
(Continued)

FOREIGN PATENT DOCUMENTS

CN 103049761 B 8/2016
CN 108874113 A * 11/2018 ............. A45D 42/08
(Continued)

OTHER PUBLICATIONS

Apple Support, "Take and edit photos or videos in Messages in iPhone", published on Nov. 15, 2019 to https://support.apple.com/en-sg/guide/iphone/iph3d039f23/ios, retrieved Dec. 13, 2023. (Year: 2019).*

(Continued)

*Primary Examiner* — Shourjo Dasgupta
(74) *Attorney, Agent, or Firm* — Schwegman Lundberg & Woessner, P.A.

(57) ABSTRACT

Aspects of the present disclosure involve a system comprising a computer-readable storage medium storing a program and method for displaying augmented reality content. The program and method provide for displaying, within a messaging application running on a device, a first user interface for viewing a media content item; receiving user input via the first user interface, the user input corresponding to a predefined touch gesture; and in response to receiving the user input, switching, within the messaging application, from the first user interface to a second user interface in which a camera of the device is activated to capture an image, and displaying, via the second user interface, a resized version of the media content item with the image.

19 Claims, 11 Drawing Sheets

Related U.S. Application Data

(60) Provisional application No. 63/000,185, filed on Mar. 26, 2020.

(51) Int. Cl.
| | |
|---|---|
| *G06F 3/0482* | (2013.01) |
| *G06F 3/04845* | (2022.01) |
| *G06F 3/0488* | (2022.01) |
| *G06V 20/20* | (2022.01) |
| *H04L 51/046* | (2022.01) |
| *H04N 5/272* | (2006.01) |
| *H04N 23/63* | (2023.01) |

(52) U.S. Cl.
CPC ...... *G06F 3/04845* (2013.01); *G06F 3/04883* (2013.01); *G06V 20/20* (2022.01); *H04L 51/046* (2013.01); *H04N 5/272* (2013.01); *H04N 23/632* (2023.01); *G06F 2203/04808* (2013.01)

(58) Field of Classification Search
CPC .. G06K 9/00624; H04L 51/046; H04N 5/272; H04N 5/232935
See application file for complete search history.

(56) References Cited

U.S. PATENT DOCUMENTS

| | | | |
|---|---|---|---|
| 8,208,042 | B2 | 6/2012 | Hong |
| 8,487,938 | B2 | 7/2013 | Latta et al. |
| 8,856,691 | B2 | 10/2014 | Geisner et al. |
| 9,058,764 | B1 | 6/2015 | Persson et al. |
| 9,171,198 | B1* | 10/2015 | Raffle ............... G02B 27/01 |
| 9,225,897 | B1 | 12/2015 | Sehn et al. |
| 9,230,160 | B1 | 1/2016 | Kanter |
| 9,276,886 | B1 | 3/2016 | Samaranayake |
| 9,407,816 | B1 | 8/2016 | Sehn |
| 9,646,522 | B2* | 5/2017 | Ratcliff ............... G06F 3/011 |
| 9,705,831 | B2 | 7/2017 | Spiegel |
| 9,716,861 | B1 | 7/2017 | Poel et al. |
| 9,742,713 | B2 | 8/2017 | Spiegel et al. |
| 9,940,477 | B2 | 4/2018 | Sibillo |
| 10,057,731 | B2* | 8/2018 | Grossman ............. H04W 4/185 |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,904,193 | B1 | 1/2021 | Al Majid et al. |
| 10,956,770 | B1 | 3/2021 | Lerner et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,086,510 | B2 | 8/2021 | Shi et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,165,838 | B1* | 11/2021 | Schrantz ............... G06F 3/0481 |
| 11,169,600 | B1 | 11/2021 | Canberk et al. |
| 11,200,602 | B1 | 12/2021 | Franklin et al. |
| 11,227,626 | B1 | 1/2022 | Krishnan Gorumkonda et al. |
| 11,307,746 | B2* | 4/2022 | Chesnokov ......... G06F 3/04883 |
| 11,307,747 | B2 | 4/2022 | Dancie et al. |
| 11,531,402 | B1 | 12/2022 | Stolzenberg |
| 11,546,505 | B2 | 1/2023 | Canberk |
| 11,675,494 | B2 | 6/2023 | Mourkogiannis |
| 2006/0125799 | A1* | 6/2006 | Hillis ................. G06F 3/04815 345/173 |
| 2009/0012788 | A1 | 1/2009 | Gilbert et al. |
| 2009/0175609 | A1 | 7/2009 | Tan |
| 2010/0114736 | A1 | 5/2010 | Lewis et al. |
| 2010/0321534 | A1 | 12/2010 | Kim |
| 2011/0301934 | A1 | 12/2011 | Tardif |
| 2012/0005595 | A1 | 1/2012 | Gavade et al. |
| 2012/0013770 | A1 | 1/2012 | Stafford et al. |
| 2012/0246562 | A1* | 9/2012 | Maness ................. G06F 40/174 715/256 |
| 2013/0194437 | A1 | 8/2013 | Osman |
| 2014/0096063 | A1* | 4/2014 | Kano ............ H04N 21/440263 715/778 |
| 2014/0171036 | A1 | 6/2014 | Simmons |
| 2015/0049234 | A1 | 2/2015 | Jung et al. |
| 2015/0058229 | A1 | 2/2015 | Wiacek et al. |
| 2015/0120293 | A1 | 4/2015 | Wohlert et al. |
| 2015/0172238 | A1 | 6/2015 | Ahmed et al. |
| 2015/0172599 | A1 | 6/2015 | Caldwell |
| 2015/0370320 | A1 | 12/2015 | Connor |
| 2016/0188153 | A1 | 6/2016 | Lerner et al. |
| 2016/0196584 | A1 | 7/2016 | Franklin et al. |
| 2016/0216871 | A1 | 7/2016 | Stamatiou |
| 2017/0034428 | A1 | 2/2017 | Kwon et al. |
| 2017/0070606 | A1 | 3/2017 | Bandyopadhyay et al. |
| 2017/0123487 | A1 | 5/2017 | Hazra et al. |
| 2017/0160906 | A1 | 6/2017 | Ju et al. |
| 2017/0178404 | A1* | 6/2017 | Dillard ................. G06F 3/04886 |
| 2017/0220212 | A1 | 8/2017 | Yang et al. |
| 2017/0249058 | A1* | 8/2017 | Fisher ................... G06F 16/41 |
| 2017/0277684 | A1 | 9/2017 | Dharmarajan Mary |
| 2017/0277685 | A1 | 9/2017 | Takumi |
| 2017/0336899 | A1 | 11/2017 | Szeto |
| 2017/0351910 | A1 | 12/2017 | Elwazer et al. |
| 2018/0067641 | A1 | 3/2018 | Lerner et al. |
| 2018/0075883 | A1 | 3/2018 | Aroyo et al. |
| 2018/0158370 | A1 | 6/2018 | Pryor |
| 2018/0188815 | A1* | 7/2018 | Deng ................. G06F 3/04842 |
| 2018/0249200 | A1* | 8/2018 | Wang ................. H04N 21/4788 |
| 2018/0351895 | A1 | 12/2018 | Rathod |
| 2019/0095436 | A1* | 3/2019 | Martinazzi ............. G06T 11/60 |
| 2019/0130616 | A1 | 5/2019 | Charlton et al. |
| 2019/0166400 | A1 | 5/2019 | Andreou et al. |
| 2019/0179759 | A1* | 6/2019 | Sathish ................. G06F 16/958 |
| 2019/0207883 | A1 | 7/2019 | Gledhill |
| 2019/0207885 | A1 | 7/2019 | Kozhemiak et al. |
| 2019/0238783 | A1 | 8/2019 | Park et al. |
| 2019/0246064 | A1* | 8/2019 | Chastney ............... H04N 23/90 |
| 2019/0342240 | A1 | 11/2019 | Garrido et al. |
| 2019/0392483 | A1 | 12/2019 | Franklin et al. |
| 2020/0057804 | A1 | 2/2020 | Apanovych et al. |
| 2020/0120269 | A1 | 4/2020 | Shirmohamadi |
| 2020/0401639 | A1* | 12/2020 | Kussmaul ........... G06F 16/9535 |
| 2021/0006519 | A1 | 1/2021 | Taitz et al. |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0158961 | A1 | 5/2022 | Stamatiou et al. |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |

(56) References Cited

U.S. PATENT DOCUMENTS

2022/0326781 A1    10/2022    Hwang et al.
2022/0334649 A1    10/2022    Hwang et al.

FOREIGN PATENT DOCUMENTS

| | | |
|---|---|---|
| CN | 109952572 A | 6/2019 |
| CN | 110764921 A | 2/2020 |
| CN | 115443641 A | 12/2022 |
| EP | 3707693 A1 | 9/2020 |
| EP | 4128672 B1 | 1/2024 |
| KR | 20100136833 | 12/2010 |
| KR | 20220158824 A | 12/2022 |
| KR | 102586855 B1 | 10/2023 |
| WO | WO-2016168591 A1 | 10/2016 |
| WO | WO-2019094618 A1 | 5/2019 |
| WO | WO-2021194755 A1 | 9/2021 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

Material Design, "Gestures", published on May 10, 2018 to https://m2.material.io/design/interaction/gestures.html#principles, retrieved Dec. 13, 2023. (Year: 2018).*
"Access Recent Photos by Swiping Left from iPhone Camera App", published on Jan. 24, 2012 to https://osxdaily.com/2012/01/24/access-photos-by-swiping-left-from-iphone-camera-app, retrieved Dec. 13, 2023. (Year: 2012).*
MetaFilter, "Details about iOS Photo Permissions", published on Apr. 24, 2018 to https://ask.metafilter.com/321529/Details-about-iOS-Photo-Permissions, retrieved Dec. 14, 2023. (Year: 2018).*
David Good, "iPhone Apps Can't Access Photos and Don't Show up Under Settings > Privacy > Photos", published on Jan. 20, 2020 to https://medium.com/@davidagood/iphone-apps-cant-access-photos-and-don-t-show-up-under-settings-privacy-photos-ios-12-2020-85863551d502, retrieved Dec. 14, 2023. (Year: 2020).*
Jerad Hill Tech, "iPhone 6 Plus Tips—How to Quickly Access the Camera Roll from the Camera", published on YouTube on Jul. 3, 2015 at https://www.youtube.com/watch?v=SlSl4y2dZLk, retrieved Dec. 14, 2023 (Year: 2015).*
Instagram Help Center, "Controlling Your Visibility", published on Apr. 20, 2014 to https://help.instagram.com/116024195217477, retrieved Apr. 2, 2024. (Year: 2014).*
Instagram Help Center, "Who can mention or tag you on Instagram", published on Apr. 20, 2014 to https://help.instagram.com/345505572238391, retrieved Apr. 2, 2024. (Year: 2014).*
"U.S. Appl. No. 17/197,832, Final Office Action mailed Aug. 5, 2022", 17 pgs.
"U.S. Appl. No. 17/197,832, Non Final Office Action mailed Apr. 20, 2022", 17 pgs.
"U.S. Appl. No. 17/197,832, Notice of Allowance mailed Feb. 1, 2023", 13 pgs.
"U.S. Appl. No. 17/197,832, Response filed Jul. 20, 2022 to Non Final Office Action mailed Apr. 20, 2022", 9 pgs.
"U.S. Appl. No. 17/197,832, Response filed Nov. 7, 2022 to Final Office Action mailed Aug. 5, 2022", 10 pgs.
"How to Reply to an Instagram Story With a Picture", Wylde Kaitlyn, Retrieved from the Internet: <URL:https://www.bustle.com/p/how-to-replyto-instagram-story-with-a-picture-becausesometimes-a-photo-says-more-than-words-ever-can-68549> [retrieved on May 28, 2021], (Jul. 6, 2017).
"How to Reply to Instagram Story with Photo or Video", TapLab, Retrieved from the Internet: URL:https://www.youtube.com/watch?v=2j OGkKhH2d4 [retrieved on Jun. 1, 2021], (Aug. 7, 2017), 1 pg.
"International Application Serial No. PCT/US2021/021892, International Preliminary Report on Patentability mailed Oct. 6, 2022", 8 pgs.
"International Application Serial No. PCT/US2021/021892, International Search Report mailed Jun. 22, 2021", 5 pgs.
"International Application Serial No. PCT/US2021/021892, Written Opinion mailed Jun. 22, 2021", 6 pgs.
"Surprise!", [Online] Retrieved from the Internet: <URL: https://www.snap.com/en-US/news/post/surprise>, (Oct. 3, 2013), 1 pg.
"There's a New, More Intimate Way to Reply to Instagram Stories", Buxton Madeline, Retrieved from the Internet: <URL:https://www.refinery29.com/en-us/2017/07/162156/instagram-stories-photo-video-reply> [retrieved on Jun. 2, 2021], (Jul. 6, 2017).
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Kastrenakes, Jacob, "Instagram now lets you reply to stories with photos and videos", Retrieved from the Internet: <URL:https://www.theverge.com/2017/7/6/15928646/instagram-story-replies-update-photos-videos> [retrieved on May 28, 2021], (Jul. 6, 2017), 3 pgs.
"Chinese Application Serial No. 202180031030.7, Office Action mailed Jan. 25, 2024", w/ English Translation, 15 pgs.
"Taplab How to Reply to Instagram Story with Photo or Video", [Online]. Retrieved from the Internet: <https:/ / www\ you tube, com/ watch?v=2j'OGkKhH2d4>, (Aug. 7, 2017), 1-9.
"Chinese Application Serial No. 202180031030.7, Office Action mailed Jul. 19, 2024", w/ English translation, 14 pgs.
"Chinese Application Serial No. 202180031030.7, Response filed Jul. 9, 2024 to Office Action mailed Jan. 25, 2024", W/English Claims, 14 pgs.
"Chinese Application Serial No. 202180031030.7, Response filed Sep. 19, 2024 to Office Action mailed Jul. 19, 2024", W/English Claims, 14 pgs.
"Korean Application Serial No. 10-2023-7033872, Notice of Preliminary Rejection mailed Nov. 11, 2024", W English Translation, 15 pgs.
"Chinese Application Serial No. 202180031030.7, Decision of Rejection mailed Nov. 27, 2024", w English translation, 23 pgs.

* cited by examiner

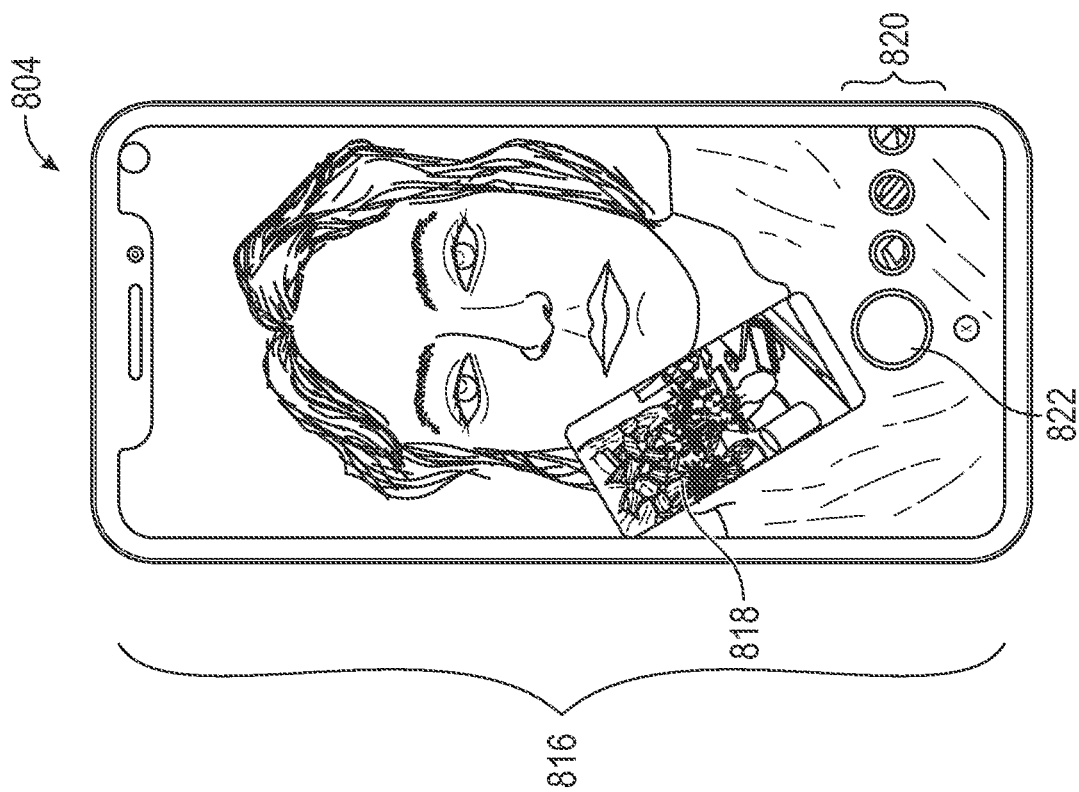
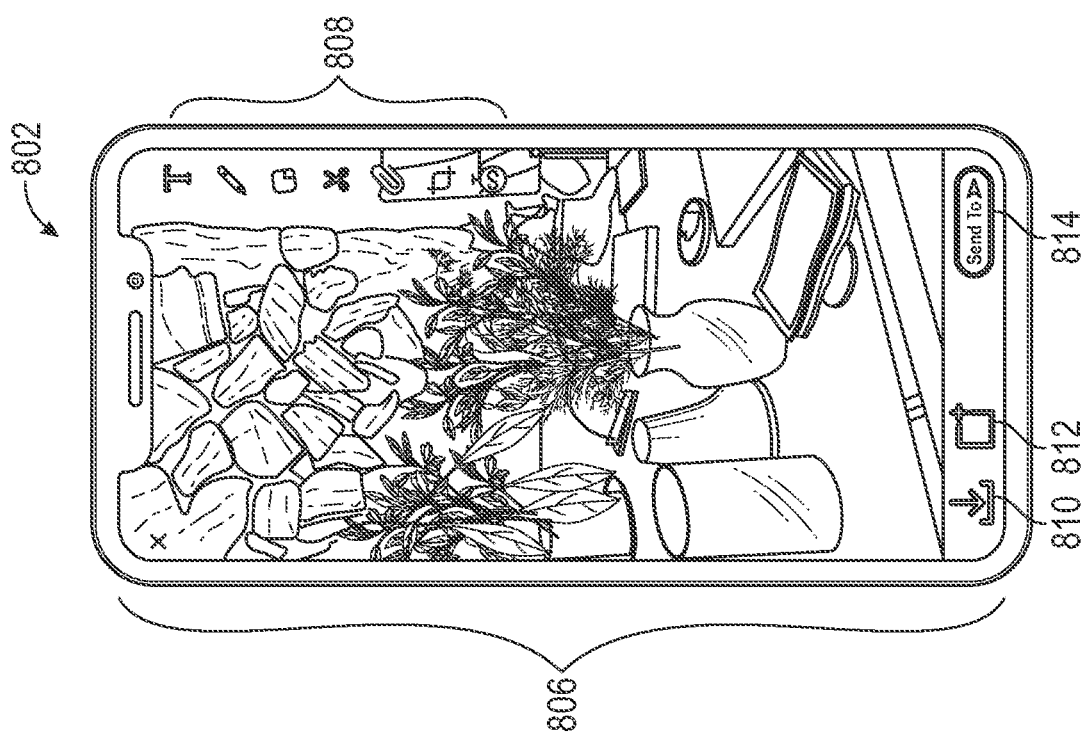

COMBINING FIRST USER INTERFACE CONTENT INTO SECOND USER INTERFACE

CROSS-REFERENCE TO RELATED APPLICATION

This patent application is a continuation of U.S. patent application Ser. No. 17/197,832, filed Mar. 10, 2021, which application claims the benefit of U.S. Provisional Patent Application No. 63/000,185, filed Mar. 26, 2020, entitled "COMBINING FIRST USER INTERFACE CONTENT INTO SECOND USER INTERFACE", which are incorporated by reference herein in their entirety.

TECHNICAL FIELD

The present disclosure relates generally to messaging applications, including providing display of augmented reality content within a messaging application.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 8A-8B illustrate a first user interface the media content of which is combined into a second user interface, in accordance with some example embodiments.

DETAILED DESCRIPTION

A messaging system typically allow users to exchange content items (e.g., messages, images and/or video) with one another in a message thread. A messaging system may implement or otherwise work in conjunction with an augmented reality system to display augmented reality content with respect to messaging. For example, the augmented reality content is combined with image data captured by a device camera in creating message content. However, a user may wish for facilitated selection of augmented reality content with respect to messaging.

The disclosed embodiments provide for a messaging application to detect a predefined gesture (e.g., a pinch gesture) within a first user interface for viewing a media content item. In response to detecting the user input, the messaging application switches to a second user interface in which a device camera is activated to capture an image. The second user interface displays the captured image together with a resized version (e.g., smaller version, such as a sticker) of the media content item.

Moreover, the second user interface includes a carousel interface with icons representing available augmented reality content items (e.g., corresponding to applying Lenses or augmented reality experiences) for displaying with the resized media content item and captured image. The icons are displayed in a ranked order based on objects detected in the media content item and the captured image.

Figure 1:
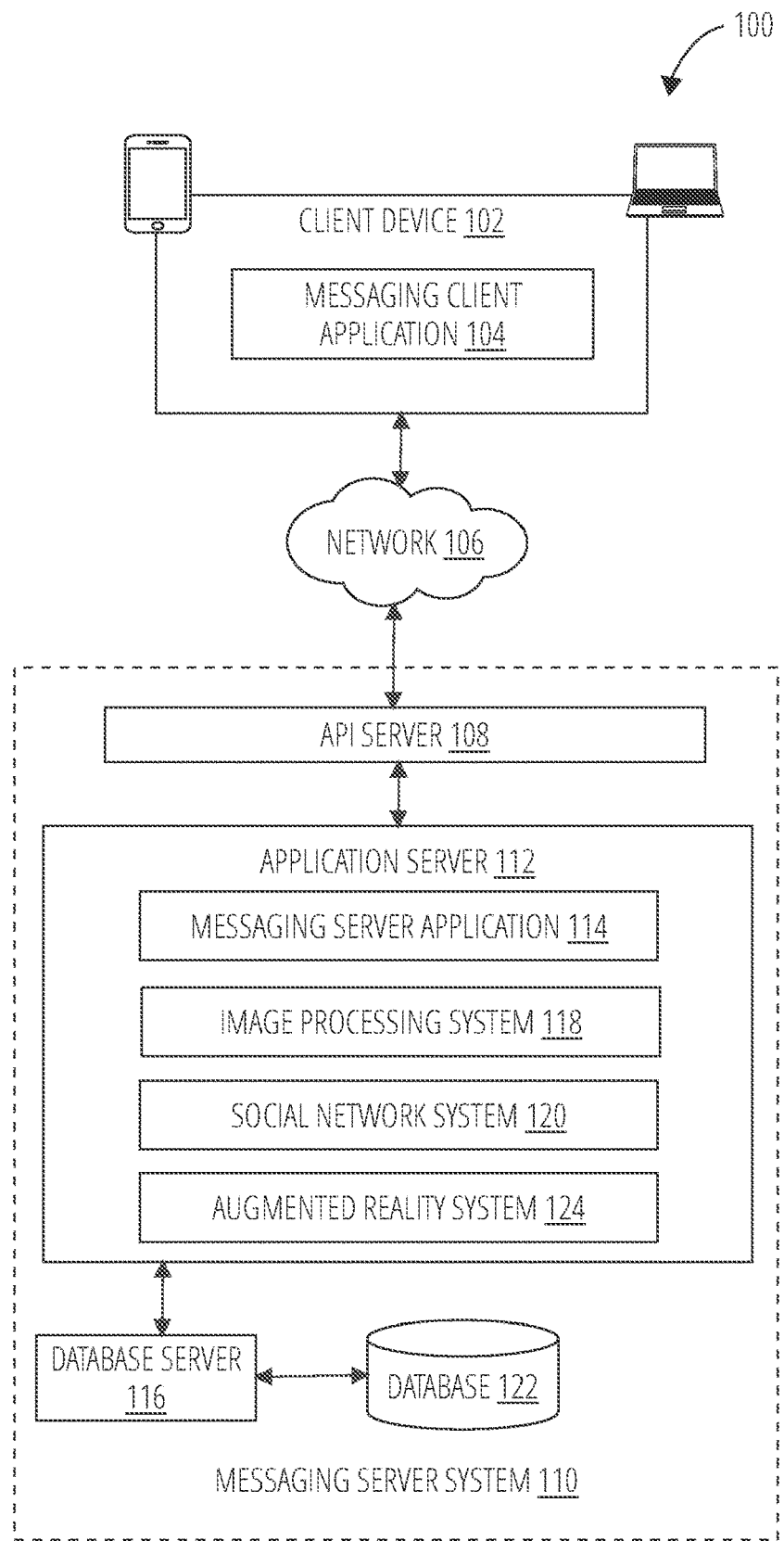
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network 106. The messaging system 100 includes instances of a client device 102, each of which hosts a number of applications, including a messaging client application 104. Each messaging client application 104 is communicatively coupled to other instances of the messaging client application 104 and a messaging server system 110 via a network 106 (e.g., the Internet).

A messaging client application 104 is able to communicate and exchange data with another messaging client application 104 and with the messaging server system 110 via the network 106. The data exchanged between the messaging client application 104, and between the other messaging client application 104 and the messaging server system 110, includes functions (e.g., commands to invoke functions) as well as payload data (e.g., text, audio, video or other multimedia data).

In some embodiments, the messaging client application 104 activates a camera of the client device 102 (e.g., upon startup of the messaging client application 104). The messaging client application 104 allows a user to request to scan one or more items in a camera feed captured by the camera. For example, the messaging client application 104 may receive a user selection of a dedicated scan option (e.g., a button) presented together with the camera feed. In an alternative embodiment, the messaging client application 104 may detect physical contact between a finger of the user's hand and a region of the touch screen for a threshold period of time. For example, the messaging client application 104 determines that the user touched and held their finger on the screen for more than three seconds. In response, the messaging client application 104 captures an image being displayed on the screen and processes the image to identify one or more objects in the image. In some embodiments, the messaging client application 104 uses one or more trained classifiers and/or environmental factors to identify the objects in the image.

The messaging server system 110 provides server-side functionality via the network 106 to a particular messaging client application 104. While certain functions of the messaging system 100 are described herein as being performed by either the messaging client application 104 or by the messaging server system 110, it will be appreciated that the location of certain functionality either within the messaging client application 104 or the messaging server system 110 is a design choice. For example, it may be technically preferable to initially deploy certain technology and functionality within the messaging server system 110, but to later migrate this technology and functionality to the messaging client application 104 where a client device 102 has a sufficient processing capacity.

The messaging server system 110 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 110, an API server 108 (application programming interface server) is coupled to, and provides a programmatic interface to, an application server 112. The application server 112 is communicatively coupled to a database server 116, which facilitates access to a database 122 in which is stored data associated with messages processed by the application server 112.

Dealing specifically with the API server 108, this server receives and transmits message data (e.g., commands and message payloads) between the client device 102 and the application server 112. Specifically, the API server 108 provides a set of interfaces (e.g., routines and protocols) that can be called or queried by the messaging client application 104 in order to invoke functionality of the application server 112. The API server 108 exposes various functions supported by the application server 112, including account registration; login functionality; the sending of messages, via the application server 112, from a particular messaging client application 104 to another messaging client application 104; the sending of media files (e.g., graphical elements, images or video) from the messaging client application 104 to the messaging server application 114, and for possible access by another messaging client application 104; a graphical element list; the setting of a collection of media data (e.g., a Story); the retrieval of such collections; the retrieval of a list of friends of a user of a client device 102; maintaining augmented reality content items; the retrieval of messages and content; the adding and deleting of friends to a social graph; the location of friends within a social graph; access to user conversation data; access to avatar information stored on messaging server system 110; and opening an application event (e.g., relating to the messaging client application 104).

The application server 112 hosts a number of applications and subsystems, including a messaging server application 114, an image processing system 118, a social network system 120, and an augmented reality system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called Stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 118 that is dedicated to performing various image processing operations, typically with respect to images or video received within the payload of a message at the messaging server application 114. In one or more embodiments, a portion of the image processing system 118 may also be implemented by the augmented reality system 124.

The social network system 120 supports various social networking functions and services and makes these functions and services available to the messaging server application 114. To this end, the social network system 120 maintains and accesses an entity graph within the database 122. Examples of functions and services supported by the social network system 120 include the identification of other users of the messaging system 100 with which a particular user has relationships or is "following" and also the identification of other entities and interests of a particular user. Such other users may be referred to as the user's friends. The social network system 120 may access location information associated with each of the user's friends to determine where they live or are currently located geographically. The social network system 120 may maintain a location profile for each of the user's friends indicating the geographical location where the user's friends live.

The messaging client application 104 includes a set of functions that allows the client device 102 to access the augmented reality system 124. The augmented reality system 124 generates and maintains a list of augmented reality content items. The augmented reality content items may correspond to augmented reality experiences (e.g., Lenses) for supplementing captured image data with augmented reality content.

In one or more embodiments, the augmented reality system 124 provides for determining (e.g., receives) one or more attributes (e.g., a name) of an object. The augmented reality system 124 provides for searching for one or more augmented reality content items (e.g., virtual objects) that are associated with the one or more attributes of the object, and for ranking the virtual objects (e.g., based on the associations and weights assigned to each of the attributes). The augmented reality system 124 causes one or more virtual objects or graphical elements of the highest ranked augmented reality content item to be presented on top of the captured image.

The application server 112 is communicatively coupled to a database server 116, which facilitates access to a database 122, in which is stored data associated with messages processed by the messaging server application 114. The database 122 may be a third-party database. For example, the application server 112 may be associated with a first entity, and the database 122 or a portion of the database 122 may be associated and hosted by a second different entity. In some embodiments, the database 122 stores user data that the first entity collects about various each of the users of a service provided by the first entity. For example, the user data includes user names, phone numbers, passwords, addresses, friends, activity information, preferences, videos or content consumed by the user, and so forth.

Figure 2:
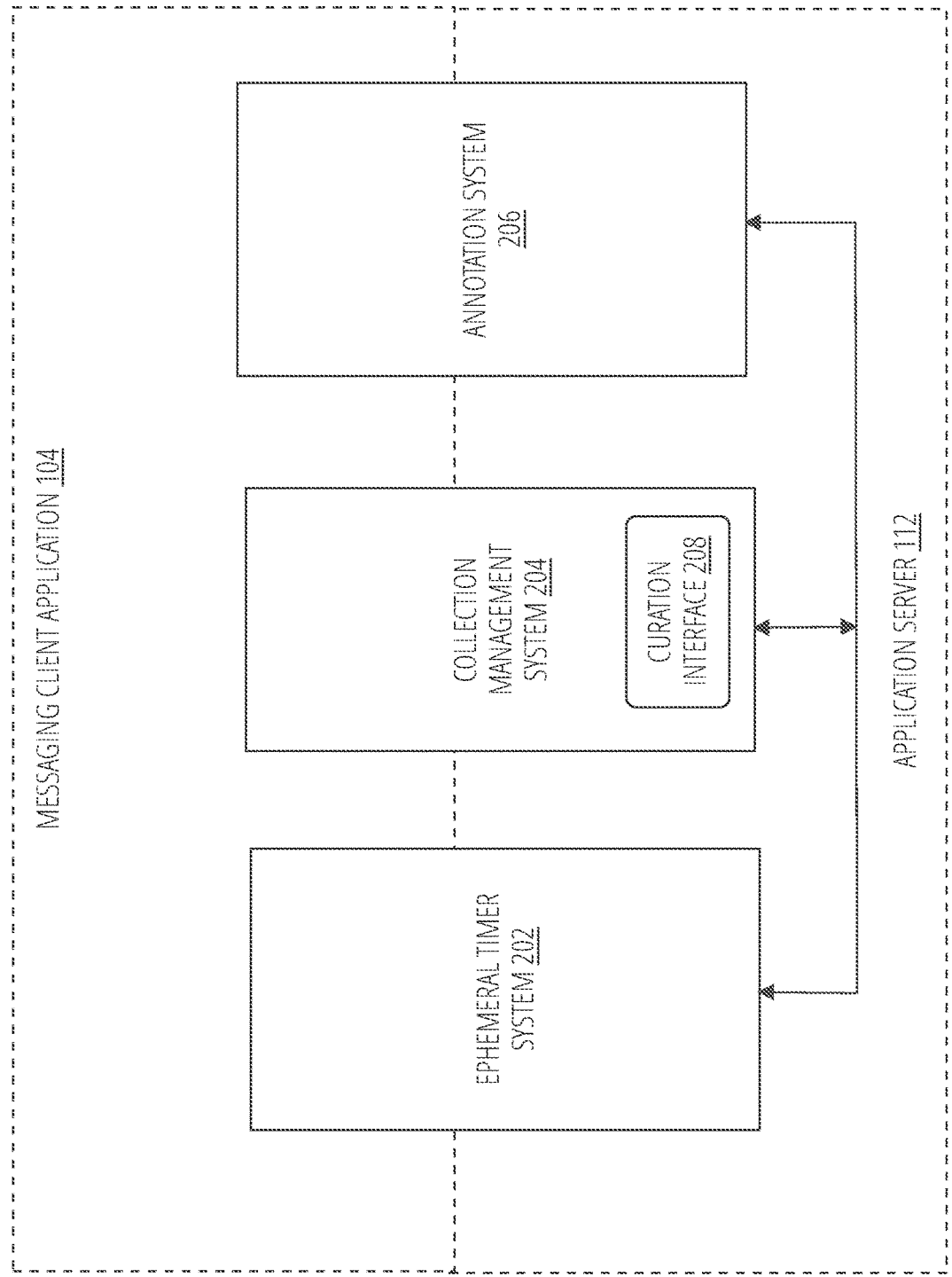
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 122 and accessed through the database server 116.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
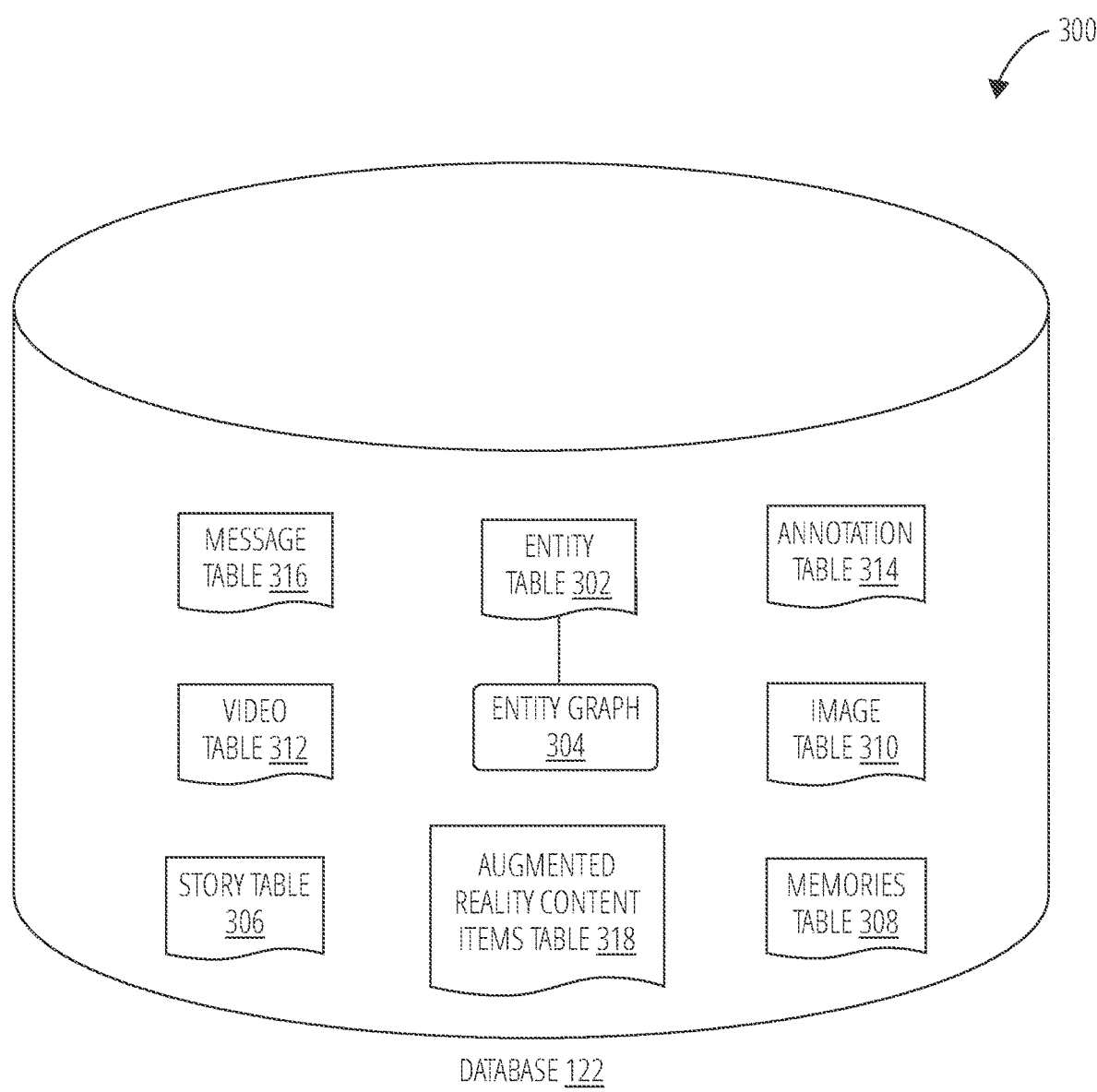
FIG. 3 is a diagrammatic representation of a data structure as maintained in a database, in accordance with some example embodiments.

FIG. 3 is a schematic diagram illustrating data structures 300 which may be stored in the database 122 of the messaging server system 110, according to certain example embodiments. While the content of the database 122 is shown to comprise a number of tables, it will be appreciated that the data could be stored in other types of data structures (e.g., as an object-oriented database).

The database 122 includes message data stored within a message table 316. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 110 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization), interest-based, or activity-based, merely for example.

The message table 316 may store a collection of conversations between a user and one or more friends or entities. The message table 316 may include various attributes of each conversation, such as the list of participants, the size of the conversation (e.g., number of users and/or number of messages), the chat color of the conversation, a unique identifier for the conversation, and any other conversation related feature(s).

The database 122 also stores annotation data, in the example form of filters, in an annotation table 314. The database 122 also stores annotated content received in the annotation table 314. Filters for which data is stored within the annotation table 314 are associated with and applied to videos (for which data is stored in a video table 312) and/or images (for which data is stored in an image table 310). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 310 are augmented reality content items (e.g., corresponding to augmented reality experiences or Lenses). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection (e.g., Viola-Jones). Then, an Active Shape Model (ASM) algorithm is applied to the face region of an image to detect facial feature reference points.

In other embodiments, other methods and algorithms suitable for face and/or object detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of an object (e.g., a face) within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 312 stores video data which, in one embodiment, is associated with messages for which records are maintained within the message table 316. Similarly, the image table 310 stores image data associated with messages for which message data is stored in the entity table 302. The entity table 302 may associate various annotations from the annotation table 314 with various images and videos stored in the image table 310 and the video table 312.

The augmented reality content items table 318 stores an indication (e.g., a list) of augmented reality content items available for selection and activation by the messaging client application 104. In one or more embodiments, each augmented reality content item in the augmented reality content items table 318 is associated with one or more object attributes. Each augmented reality content item in the augmented reality content items table 318 may also be associated with one or more predefined words (e.g., using metadata labels, designations, and the like). In one or more embodiments, the messaging client application 104 searches the object attributes and/or predefined words stored in the augmented reality content items table 318 to identify one or more augmented reality content items associated with a scanned object or an object identified in a captured image. Each augmented reality content item stored in the augmented reality content items table 318 includes one or more graphical elements or virtual objects which may or may not be animated. Each augmented reality content item also includes instructions on where to position the graphical elements or virtual objects relative to other objects depicted in the captured image.

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a collection of content that has been created and sent/broadcast by that user. To this end, the UI of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from various locations and events. Users whose client devices have location services enabled and are at a common location event at a particular time may, for example, be presented with an option, via a UI of the messaging client application 104, to contribute content to a particular live Story. The live Story may be identified to the user by the messaging client application 104 based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

A memories table 308 stores data regarding one or more user "memories," where each user memory corresponds to content (e.g., images, videos and/or audio files) saved by an individual user for subsequent access by that user. The creation and saving of a particular user memory may be initiated by the individual user (e.g., each user for which a record is maintained in the entity table 302). Moreover, each user memory stored within the memories table 308 may be viewed, edited and/or sent by the individual user.

For example, if a user creates content (e.g., for exchanging with others in messaging), the created content, by default, may typically be automatically deleted and removed from storage after a specified time period (e.g., one hour, one minute, one second, etc.). However, if prior to the specified time period when the content is automatically deleted, the user selects the content for permanent retention (e.g., via a "save" interface), the content may be added as a user memory in the memories table 308. The saved content may be accessible by the individual user for viewing, editing and/or sharing with other users.

Figure 4:
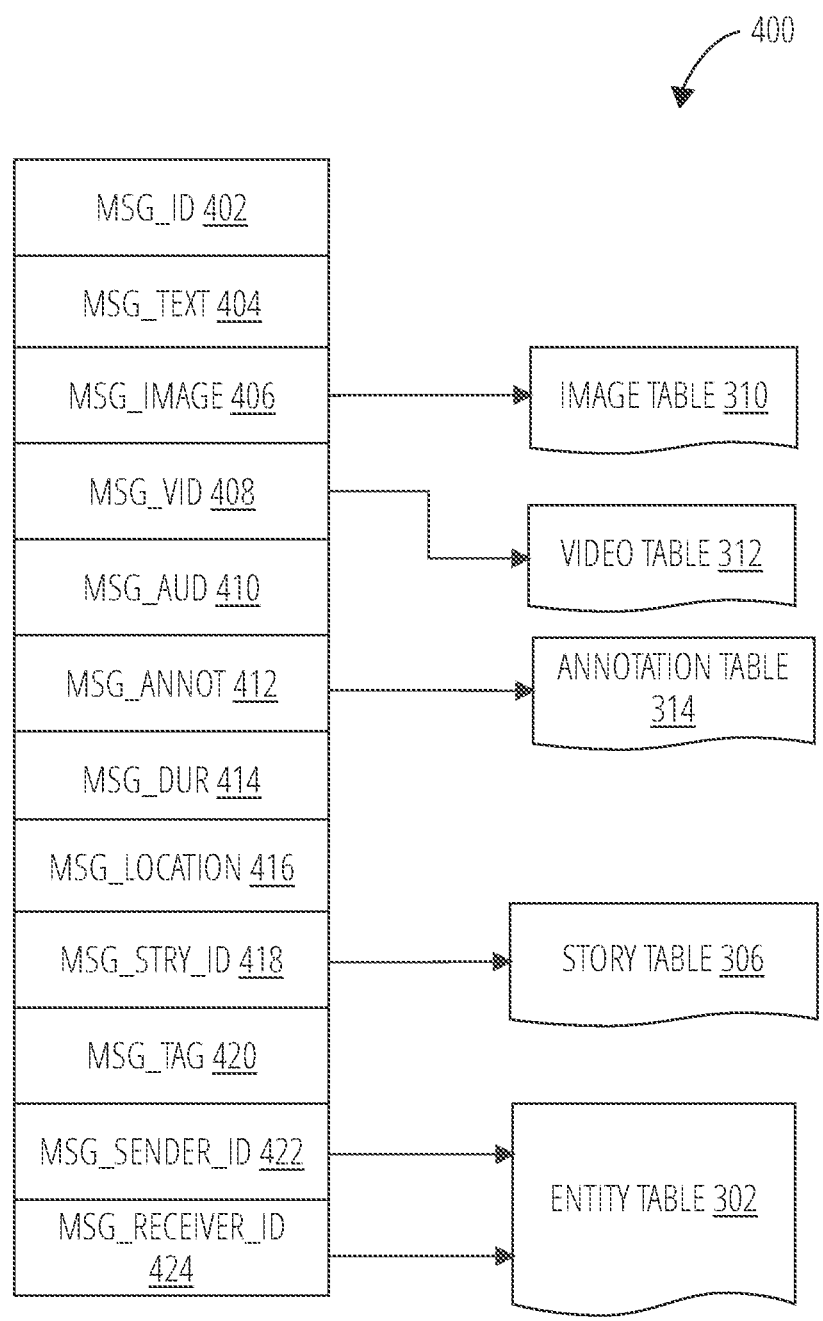
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 316 stored within the database 122, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 310. Similarly, values within the message video payload 408 may point to data stored within a video table 312, values stored within the message annotations 412 may point to data stored in an annotation table 314, values stored within the message story identifier 418 may point to data stored in a story table 306, and values stored within the message sender identifier 422 and the message receiver identifier 424 may point to user records stored within an entity table 302.

Figure 5:
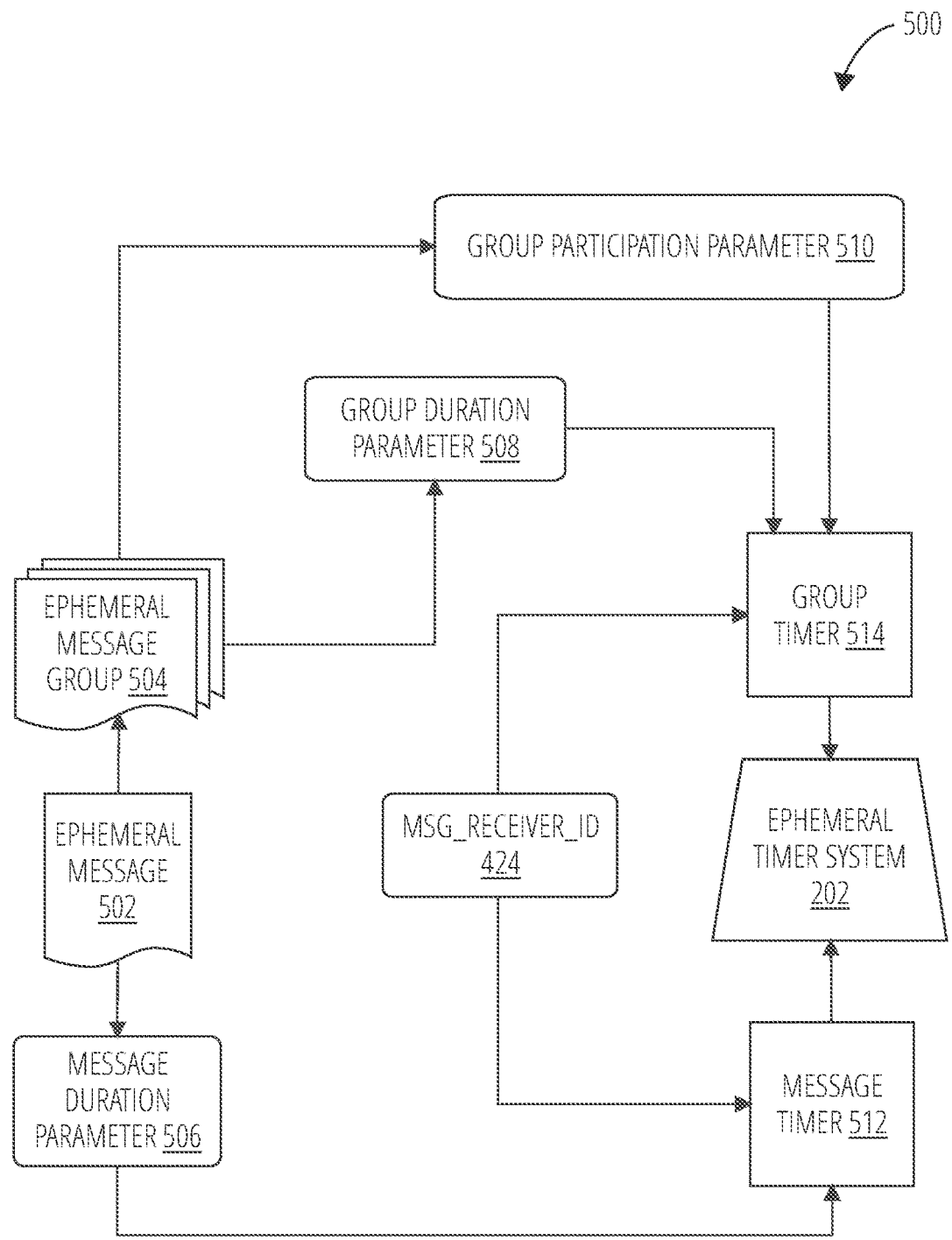
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
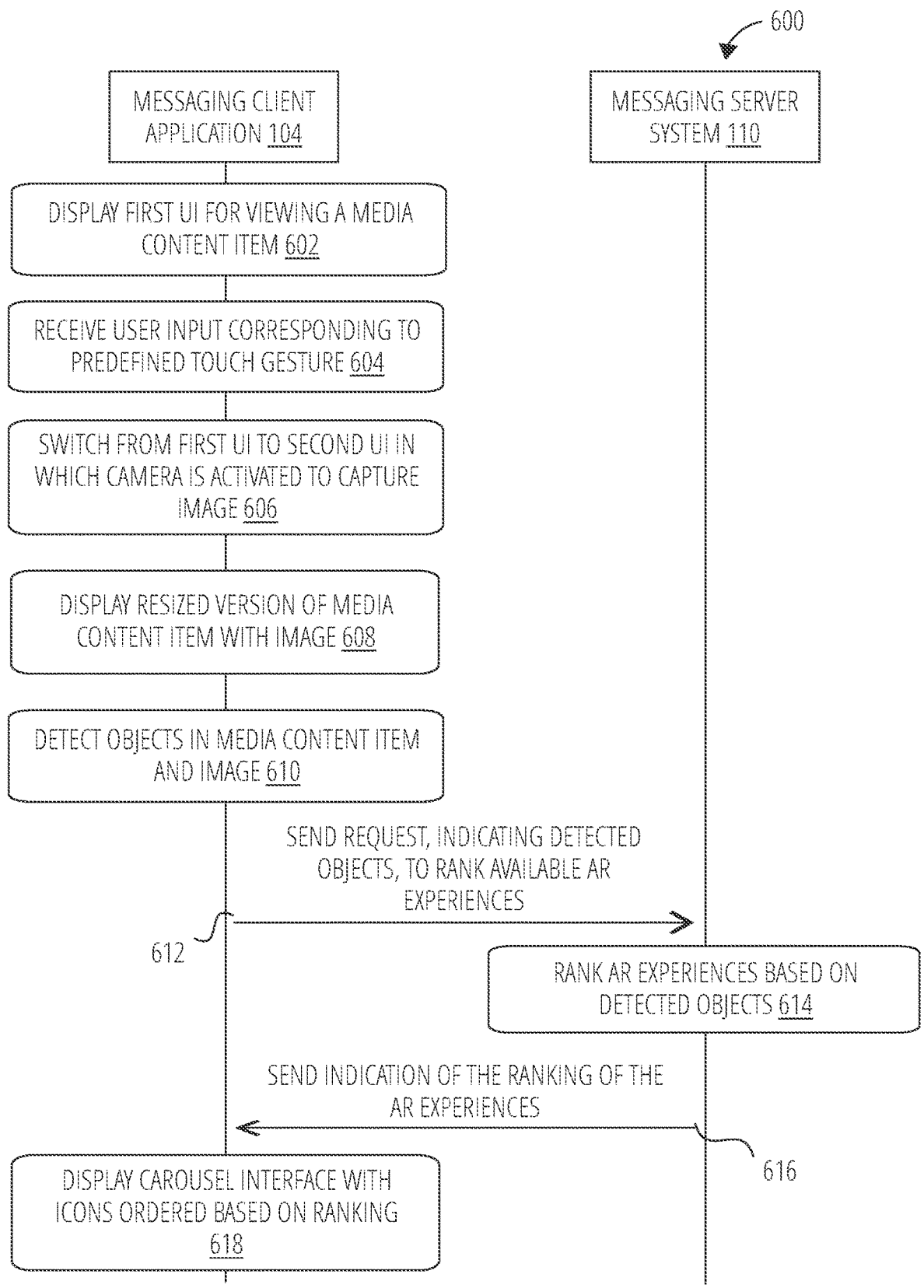
FIG. 6 is an interaction diagram illustrating a process for combining media content from a first user interface into a second user interface, in accordance with some example embodiments.

FIG. 6 is an interaction diagram illustrating a process 600 for combining media content from a first user interface into a second user interface, in accordance with some example embodiments. For explanatory purposes, the process 600 is primarily described herein with reference to the messaging client application 104 of the client device 102, and the messaging server system 110 of FIG. 1. However, one or more blocks (or operations) of the process 600 may be performed by one or more other components, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As described herein, the messaging client application 104 is configured to allow a first user to perform a predefined gesture (e.g., a pinch gesture) on a first user interface for viewing a media content item. In response to the user input, the messaging client application 104 switches to a second user interface in which a device camera is activated to capture an image. The second user interface displays the captured image with a smaller version (e.g., a sticker) of the media content item. The messaging client application 104 further displays a carousel interface with icons corresponding to available augmented reality content items. The icons are displayed in a ranked order based on objects detected in the media content item and the captured image.

Thus, at block 602, the messaging client application 104 displays a first user interface for viewing a media content item (e.g., an image and/or video with any annotation(s)). For example, the media content item corresponds to a media message received from a second user (e.g., with the first and second users being contacts). As noted above, the messaging server system 110 may implement and/or work in conjunction with the social network system 120 to determine that the first user and the second user are contacts (e.g., friends) with respect to the messaging server system 110.

In another example, the media content item corresponds to a user memory (e.g., in association with the memories table 308). The user memory may be accessible by the first user for viewing, editing and/or sharing with other users (e.g., friends).

In another example, the media content item corresponds to a Story (e.g., in association with the story table 306), such as a personal Story, a live Story and/or a location Story. As noted above, a Story corresponds to a collection of messages and associated image, video, or audio data. In one or more embodiments, Stories are accessible via a friends list interface with available Stories provided by friends of the first user. Alternatively or in addition, Stories are accessible via a subscription list interface which displays with available Stories provided by publishers (e.g., merchants, social media influencers, businesses, advertisers, and the like).

In another example, the media content item corresponds to a message preview. For example, the message preview corresponds to previewing a message which includes media content (e.g., an image and/or video) as captured by the device camera. In one or more embodiments, the message preview provides one or more user-selectable editing tools (e.g., for drawing, adding text, adding stickers, cropping, and the like) for modifying/annotating the media content.

As noted, the above-described media content items correspond to examples. The process 600 is not limited to these examples, and the process 600 may apply to other types of media content items.

At block 604, the messaging client application 104 receives user input corresponding to a predefined touch gesture. For example, the user input corresponds to a pinch gesture performed in association with the first user interface, and the messaging client application 104 is configured to detect such gesture.

In response to detecting the predefined touch gesture, the messaging client application 104 switches from the first user interface to a second user interface in which a camera of the client device 102 is activated to capture an image (block 606).

In one or more embodiments, the second user interface corresponds to an interface for composing/generating media content (e.g., for including in a message, Story, and the like). In one or more embodiments, the second user interface includes a carousel interface with user-selectable icons, each of which corresponds to a respective augmented reality content item for display.

In displaying the second user interface, the messaging client application 104 displays a resized version of the media content item from the first user interface, together with the image captured by the device camera (block 608). For example, the resized version of the media content item corresponds to a smaller-sized version of the media content item. In one or more embodiments, in reducing the size of the media content item, the messaging client application 104 provides an animation which depicts the media content item as shrinking until the smaller size is reached. The smaller size may correspond to a default size predefined by the messaging client application 104. Alternatively or in addition, the smaller size may be specified by the user (e.g., where the size may vary as the user continues the pinch gesture and/or a pull gesture).

In one or more implementations, the resized version of the media content item corresponds to a sticker which overlays the image captured by the device camera. The messaging client application 104 may provide for the user to resize the sticker (e.g., in response to pinch/pull input performed on the sticker). Alternatively or in addition, the messaging client application 104 may provide for the user to reposition the sticker (e.g., in response to a drag gesture performed on the sticker). In one or more embodiments, the messaging client application 104 provides for storing the resized version of the media content item (e.g., image and/or video with any annotation(s)), for example, to facilitate such resizing and/or repositioning of the media content item.

In one or more implementations, display of the media content item within the first user interface may be subject to one or more restrictions. The messaging client application 104 provides for conforming with the restrictions with respect to displaying the resized version of the media content item.

For example, the media content item may be subject to a timer (e.g., specified by the second user) in association with the ephemeral timer system 202. Thus, the messaging client application 104 provides for conforming with the time-based restriction with respect to displaying the resized version of the media content item in the second user interface.

In another example, since the media content item was sent from the second user to the first user, privacy may be maintained by disallowing the first user from sharing the content of the second user interface (e.g., the captured image data combined with the resized media content item) with any user besides the second user. In yet another example, in a case where the first user screen captures or otherwise saves the captured image data combined with the resized media content item, the messaging client application 104 may provide for notifying the second user (e.g., the sending user) of such screen capture/save operation.

As noted above, the second user interface includes a carousel interface with icons. Each icon is user-selectable, and corresponds to a respective augmented reality content item (e.g., augmented reality experience) for displaying respective augmented reality content. The augmented reality content is displayed together with the resized media content item and the image captured by the device camera. In one or more embodiments, the icons are displayed in a ranked order.

To perform the ranking, the messaging client application 104 detects one or more objects in each of the media content item and the captured image (block 610). As noted above, the messaging client application 104 is configured to implement or otherwise access object recognition algorithms (e.g., including machine learning algorithms) configured to scan an image, and to detect/track the movement of objects within the image. By way of non-limiting example, detectable objects within an image include: a human face, parts of a human body, animals and parts thereof, landscapes, objects in nature, non-living objects (e.g., chairs, books, cars, buildings, other structures), illustrations of objects (e.g., on posters and/or flyers), text-based objects, equation-based objects and the like. Moreover, the messaging client application 104 is configured to determine or otherwise access attributes of objects, such as a name, type, genre, color, size, shape, texture, geolocation and/or other supplemental information (e.g., a song title/artist for an object corresponding to media).

Thus, in one or more embodiments, the messaging client application 104 scans each of the media content item and the captured image in order to detect respective objects therein. For example, the scanning is performed with respect to the combined display of the resized media content item with the captured image data. Alternatively, a separate scan is performed for each of the media content item (e.g., without necessarily having been resized) and the captured image data in order to detect respective object(s) in each.

At operation 612, the messaging client application 104 sends a request, indicating the detected objects, to the messaging server system 110, for ranking the available augmented reality content items. Responsive to the request, the messaging server system 110 ranks the augmented reality content items based on the detected objects (block 614).

For example, available augmented reality content items are ranked by comparing one or more attributes of the detected objects (from the media content item and/or the capture image) with corresponding augmented reality content item attributes/words (e.g., as stored in the augmented reality content items table 318). Moreover, in case multiple augmented reality content items are available for a detected object (e.g., a user's face), augmented reality content items may be ranked based on one or more parameters such as preferences/history of augmented reality content items selected by the user, popularity of augmented reality content items among system users, newly-available augmented reality content items, and the like.

In one or more embodiments, certain augmented reality content items are configured to create effects with respect to two separate objects (e.g., combinations of faces and/or other objects). For example, a face swapping effect provides for digitally swapping detected faces. Other effects provide for swapping entire bodies (e.g., human bodies) or parts thereof, swapping selected parts of other objects, segmenting out objects or parts thereof, and the like. The augmented reality content items table 318 may store attribute(s) with respect to augmented reality content items configured to create such effects (e.g., swapping-type effects between two objects). In one or more embodiments, the messaging server system 110 is configured to provide a higher ranking for such augmented reality content items, in a case where applicable objects are detected in each of the media content item and the captured image data.

The messaging server system 110 sends an indication of the ranking to the messaging client application 104 (operation 616). For example, the ranking indicates an order in which the available augmented reality content items are to be displayed (e.g., within the carousel interface). Based on the received rankings, the messaging client application 104 displays a carousel interface with icons, each for selecting a respective augmented reality content item, in ranked order (block 618).

In one or more embodiments, the ranking further indicates a highest-ranked augmented reality content item. Thus, in combining the resized media content item and the capture image for display, the messaging client application 104 may additionally display the highest-ranked augmented reality content item (e.g., corresponding to applying a highest-ranked augmented reality experience). For example, based on user opt-in (e.g., a setting), the messaging client application 104 defaults to setting the highest-ranked augmented reality content item as an augmented reality content item that is automatically activated (e.g., in response to the pinch gesture to display a resized media content with a captured image).

Thus, the messaging system 100 as described herein provides for switching from a first user interface for viewing a media content item, to a second user interface for viewing a captured image with a resized version of the media content item. Moreover, the messaging system 100 provides for ranking augmented reality content items (e.g., augmented reality experiences) based on detected objects in both the media content item and the captured image. By virtue of these features, it is possible to provide for more facilitated and/or engaging messaging between users.

Figures 7A, 7B:
FIGS. 7A-7B illustrate a first user interface the media content of which is combined into a second user interface, in accordance with some example embodiments.

FIGS. 7A-7B illustrate a first user interface the media content of which is combined into a second user interface, in accordance with some example embodiments. The user interface 702 of FIG. 7A and the user interface 704 of FIG. 7B correspond to different user interfaces of the messaging client application 104 running on the client device 102 of a first user.

In the example of FIG. 7A, the user interface 702 is configured for the first user to view a media message received from a second user (e.g., a sender 708), with the first and second users being friends/contacts within the messaging system 100. The media message includes captured image data 706 corresponding to an image provided/captured by the second user at their respective device.

The example of FIG. 7A illustrates the user interface 702 as corresponding to a received message. However, as noted above, the user interface 702 may also apply for other types of media content items such as, but not limited to: a user memory, a Story, and/or a message preview (e.g., as discussed below with respect to FIGS. 8A-8B).

In response to predefined user input (e.g., a pinch gesture) detected at the device screen while displaying the user interface 702, the messaging client application 104 switches from display of the user interface 702 to the user interface 704, in which a camera of the client device 102 is activated to capture an image (e.g., the captured image data 710). In one or more embodiments, the user interface 704 corresponds to an interface for composing/generating media content (e.g., for including in a message, Story, and the like).

As shown in the example of FIG. 7B, the user interface 704 further includes a resized image 712, corresponding to a resized (e.g., smaller version) of the media content item (e.g., captured image data 706) included in the user interface

702. As noted above, the first user may enlarge and/or shrink the resized image 712 (e.g., via a respective pull/pinch gesture), and/or may reposition the resized image 712 within the user interface 704 (e.g., via a drag gesture).

In one or more embodiments, the user interface 704 includes a carousel interface 714 which allows the user to cycle through and/or select an augmented reality content item (e.g., an augmented reality experience) to apply with respect to the captured image data 710. Each of the available augmented reality content items is represented by an icon which is user-selectable for switching to the respective augmented reality content item. As noted above, the icons of the carousel interface 714 may be presented in a ranked order (e.g., based on ranking data received from the messaging server system 110).

In one or more embodiments, the icon corresponding to an active augmented reality content item (e.g., selected Lens icon 716) is displayed in a different manner relative to (e.g., larger than) the remaining icons. As noted above, the active augmented reality content item may correspond to a default augmented reality content item selected by the messaging client application 104 based on augmented reality content item ranking data received from the messaging server system 110. In the example of FIG. 7B, the selected Lens icon 716 corresponds to an empty/blank icon which is not associated with displaying augmented reality content. For example, this can be based on the first user having opted out (e.g., based on a user setting) from automatically activating an augmented reality experience.

In one or more embodiments, user selection of the selected Lens icon 716 provides for generating a message which includes an image (e.g., in response to a press/tap gesture of the selected Lens icon 716) and/or a video (e.g., in response to a press-and-hold gesture of the selected Lens icon 716) of the screen content, for example, to send to friends, include in a Story, and the like.

FIGS. 8A-8B illustrate a first user interface the media content of which is combined into a second user interface, in accordance with some example embodiments. The user interface 802 of FIG. 8A and the user interface 804 of FIG. 8B correspond to different user interfaces of the messaging client application 104 running on the client device 102 of a user.

In the example of FIG. 8A, the user interface 802 corresponds to a message preview which includes media content (e.g., captured image data 806) as captured by a camera of the client device 102. In one or more implementations, the user interface 802 includes editing tools 808 for modifying/annotating (e.g., drawing on, adding text to, adding stickers to, cropping, and the like) the captured image data 806. In addition, the user interface 802 includes a save button 810 for saving the captured image data 806 with any annotations(s) (e.g., as a user memory, as discussed above). Moreover, the user interface 802 includes a story button 812 for creating a Story based on the captured image data 806 with annotation(s), and a send button 814 for sending a message including the captured image data 806 with annotation(s) to a recipient (e.g., contact/friend).

In response to user input (e.g., a pinch gesture) detected at the device screen while displaying the user interface 702, the messaging client application 104 switches from display of the user interface 802 to the user interface 804, in which a camera of the client device 102 is activated to capture an image (e.g., the captured image data 816). In one or more embodiments, the user interface 804 corresponds to an interface for composing/generating media content (e.g., for including in a message, Story, and the like).

As shown in the example of FIG. 8B, the user interface 804 further includes a resized image 818, corresponding to a resized (e.g., smaller version) of the media content item (e.g., captured image data 706) included in the user interface 702. As noted above, the user may enlarge and/or shrink the resized image 818 (e.g., via a respective pull/pinch gesture), and/or may reposition the resized image 818 within the user interface 704 (e.g., via a drag gesture).

In one or more embodiments, the user interface 804 includes a carousel interface 820 which allows the user to cycle through and/or select an augmented reality content item (e.g., an augmented reality experience) to apply with respect to the captured image data 816. Each of the available augmented reality content items is represented by an icon which is user-selectable for switching to the respective augmented reality content item. As noted above, the icons of the carousel interface 820 may be presented in a ranked order (e.g., based on ranking data received from the messaging server system 110).

In one or more embodiments, the icon corresponding to an active augmented reality content item (e.g., selected Lens icon 822) is displayed in a different manner relative to (e.g., larger than) the remaining icons. As noted above, the active augmented reality content item may correspond to a default augmented reality content item selected by the messaging client application 104 based on augmented reality content item ranking data received from the messaging server system 110. In the example of FIG. 8B, the selected Lens icon 822 corresponds to an empty/blank icon which is not associated with displaying augmented reality content. For example, this can be based on the user having opted out (e.g., based on a user setting) from automatically activating an augmented reality experience.

In one or more embodiments, user selection of the selected Lens icon 822 provides for generating a message which includes an image (e.g., in response to a press/tap gesture of the selected Lens icon 822) and/or a video (e.g., in response to a press-and-hold gesture of the selected Lens icon 822) of the screen content, for example, to send to friends, include in a Story, and the like.

Figure 9:
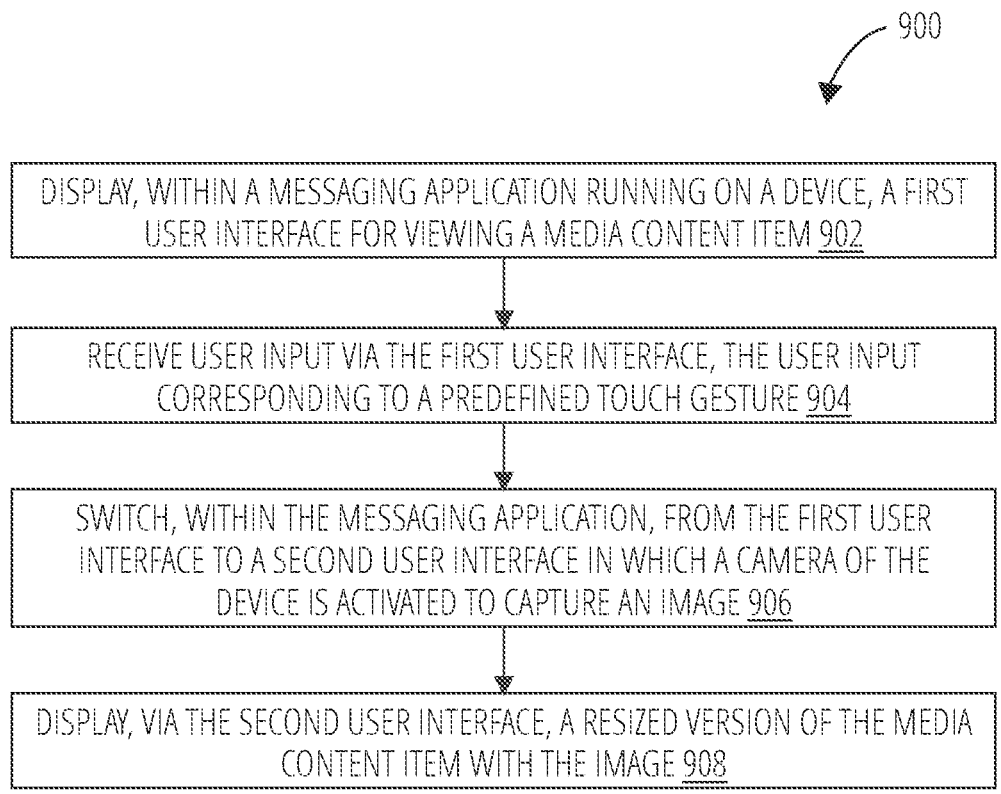
FIG. 9 is a flowchart illustrating a process for combining media content from a first user interface into a second user interface, in accordance with some example embodiments.

FIG. 9 is a flowchart illustrating a process 900 for combining media content from a first user interface into a second user interface, in accordance with some example embodiments. For explanatory purposes, the process 900 is primarily described herein with reference to the messaging client application 104 and the messaging server system 110 of FIG. 1. However, one or more blocks (or operations) of the process 900 may be performed by one or more other components, and/or by other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The messaging client application 104 displays a first user interface for viewing a media content item (block 902). At block 904, the messaging client application 104 receives user input via the first user interface, the user input corresponding to a predefined touch gesture (e.g., a pinch gesture).

In response to receiving the user input, the messaging client application 104 switches from the first user interface to a second user interface in which a camera of the device is activated to capture an image (block 906), and displays, via the second user interface, a resized version of the media content item with the image (block 908). The messaging client application 104 may display an animation which resizes the media content item to the resized version of the media content item in association with switching from the first user interface to the second user interface.

The messaging client application 104 may detect a first object displayed in the media content item, detect a second object displayed in the image, and determine a ranking for a plurality of augmented reality content items for displaying within the second user interface, the ranking being based on the first object and the second object.

Determining the ranking may include sending, to a messaging server system 110, a request to rank the plurality of augmented reality content items, the request indicating the first object and the second object, and receiving, from the messaging server system 110 and in response to sending the request, an indication of the ranking for the plurality of augmented reality content items.

The messaging client application 104 may display a carousel interface with icons ordered based on the ranking, the carousel interface comprising multiple icons, each icon being user-selectable to display a respective one of the plurality of augmented reality content items with the image.

The messaging client application 104 may receive second user input to create a second media content item which includes the media content and the image, and generate, in response to receiving the second user input, the second media content item.

The media content item may correspond to at least one of a received message, stored media content previously generated by a user of the device via the messaging application (e.g., a user memory), a collection of multimedia content (e.g., a Story), or a preview (e.g., a message preview) of a second image previously captured by the camera.

Display of the media content item within the first user interface may be subject to one or more restrictions. Displaying the resized version of the media content item conforms with the one or more restrictions.

Figure 10:
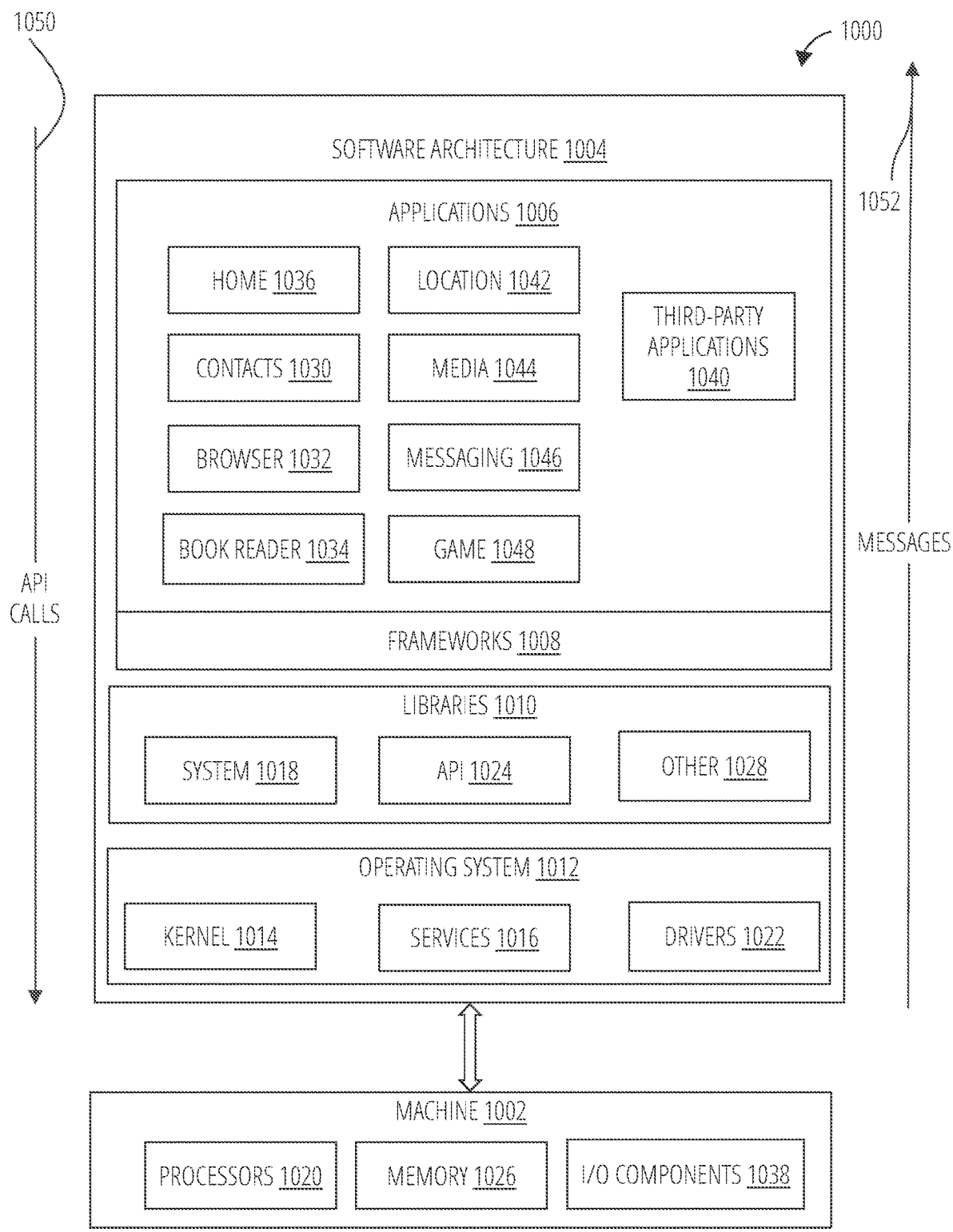
FIG. 10 is block diagram showing a software architecture within which the present disclosure may be implemented, in accordance with some example embodiments.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046 (e.g., corresponding to the messaging client application 104), a game application 1048, and a broad assortment of other applications such as third-party applications 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party applications 1040 (e.g., applications developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party applications 1040 can invoke the API calls 1050 provided by the operating system 1012 to facilitate functionality described herein.

Figure 11:
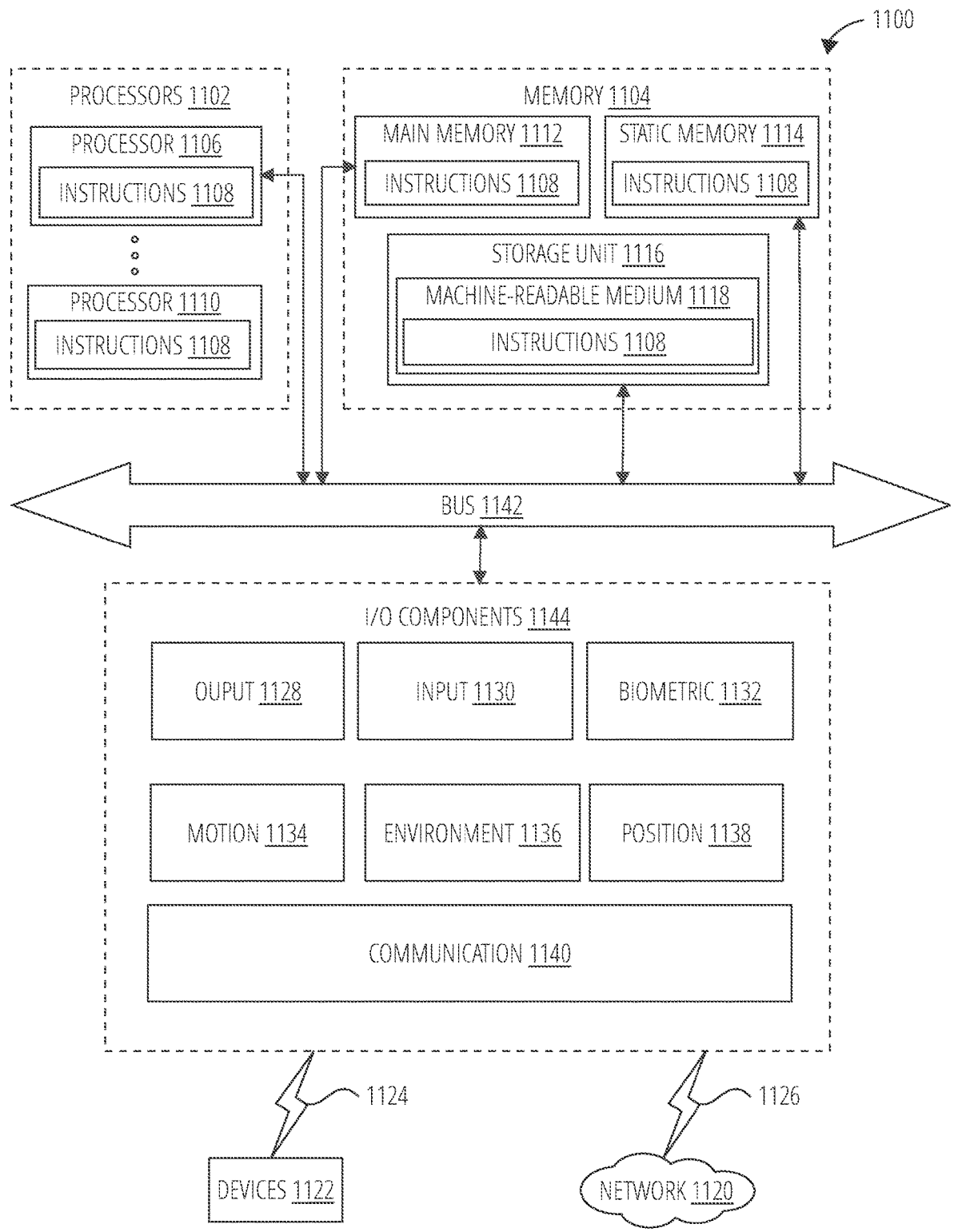
FIG. 11 is a diagrammatic representation of a machine, in the form of a computer system within which a set of instructions may be executed for causing the machine to perform any one or more of the methodologies discussed, in accordance with some example embodiments.

FIG. 11 is a diagrammatic representation of a machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1144, which may be configured to communicate with each other via a bus 1142. In an example embodiment, the processors 1102 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1142. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1144 may include a wide variety of components to receive input, provide output, produce output, transmit information, exchange information, capture measurements, and so on. The specific I/O components 1144 that are included in a particular machine will depend on the type of machine. For example, portable machines such as mobile phones may include a touch input device or other such input mechanisms, while a headless server machine will likely not include such a touch input device. It will be appreciated that the I/O components 1144 may include many other components that are not shown in FIG. 11. In various example embodiments, the I/O components 1144 may include output components 1128 and input components 1130. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), optical sensor components (e.g., a camera) and the like.

In further example embodiments, the I/O components 1144 may include biometric components 1132, motion components 1134, environmental components 1136, or position components 1138, among a wide array of other components. For example, the biometric components 1132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 include acceleration sensor components (e.g., accelerometer), gravitation sensor components, rotation sensor components (e.g., gyroscope), and so forth. The environmental components 1136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1144 further include communication components 1140 operable to couple the machine 1100 to a network 1120 or devices 1122 via a coupling 1126 and a coupling 1124, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the processors 1102) and/or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed embodiments.

The instructions 1108 may be transmitted or received over the network 1120, using a transmission medium, via a network interface device (e.g., a network interface component included in the communication components 1140) and using any one of a number of well-known transfer protocols (e.g., hypertext transfer protocol (HTTP)). Similarly, the instructions 1108 may be transmitted or received using a transmission medium via the coupling 1124 (e.g., a peer-to-peer coupling) to the devices 1122.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
  at least one processor; and
  a memory component having instructions stored thereon, when executed by the at least one processor, causes the at least one processor to perform operations comprising:
    displaying, within a messaging application running on a first device associated with a first user, a first user interface in which a camera of the first device is deactivated, the first user interface corresponding to a message preview for previewing a first media content item prior to saving the first media content item, the first media content item including a first image captured by the first device;
receiving user input via the first user interface, the user input corresponding to a pinch gesture; and
in response to receiving the user input,
activating the camera to capture a second image in real-time, and
displaying a second user interface which replaces the first user interface, the second user interface for generating a second media content item for display in the second user interface and for sending to a second user, the second media content item including the second image and a smaller version of the first media content item as a sticker overlaying the second image,
wherein the first user interface includes editing tools for modifying and annotating the first media content item prior to saving the first media content item.

2. The system of claim 1, the operations further comprising:
detecting a first object displayed in the first media content item;
detecting a second object displayed in the second image; and
determining a ranking for a plurality of augmented reality content items for displaying with the second image and the smaller version of first media content item, the ranking being based on the first object and the second object.

3. The system of claim 2, wherein determining the ranking comprises:
sending, to a server, a request to rank the plurality of augmented reality content items, the request indicating the first object and the second object; and
receiving, from the server and in response to sending the request, an indication of the ranking for the plurality of augmented reality content items.

4. The system of claim 2, the operations further comprising:
displaying a carousel interface with icons ordered based on the ranking, the carousel interface comprising multiple icons, each icon being user-selectable to display a respective one of the plurality of augmented reality content items with the second image.

5. The system of claim 1, the operations further comprising:
receiving second user input to create a second media content item which includes the smaller version of first media content item and the second image; and
generate, in response to receiving the second user input, the second media content item.

6. The system of claim 1, the operations further comprising:
displaying an animation which resizes first media content item to the smaller version of first media content item.

7. The system of claim 1, wherein display of first media content item within the first user interface is subject to one or more restrictions, and
wherein displaying the smaller version of first media content item conforms with the one or more restrictions.

8. The system of claim 7, wherein the one or more restrictions comprise a time-based restriction which limits display of the smaller version of the first media content item to a predefined time period.

9. The system of claim 7, wherein the one or more restrictions comprise a sharing restriction which restricts sharing of the second media content item.

10. A method, comprising:
displaying, within a messaging application running on a first device associated with a first user, a first user interface in which a camera of the first device is deactivated, the first user interface corresponding to a message preview for previewing a first media content item prior to saving the first media content item, the first media content item including a first image captured by the first device;
receiving user input via the first user interface, the user input corresponding to a pinch gesture; and
in response to receiving the user input,
activating the camera to capture a second image in real-time, and
displaying a second user interface which replaces the first user interface, the second user interface for generating a second media content item for display in the second user interface and for sending to a second user, the second media content item including the second image and a smaller version of the first media content item as a sticker overlaying the second image,
wherein the first user interface includes editing tools for modifying and annotating the first media content item prior to saving the first media content item.

11. The method of claim 10, further comprising:
detecting a first object displayed in the first media content item;
detecting a second object displayed in the second image; and
determining a ranking for a plurality of augmented reality content items for displaying with the second image and the smaller version of first media content item, the ranking being based on the first object and the second object.

12. The method of claim 11, wherein determining the ranking comprises:
sending, to a server, a request to rank the plurality of augmented reality content items, the request indicating the first object and the second object; and
receiving, from the server and in response to sending the request, an indication of the ranking for the plurality of augmented reality content items.

13. The method of claim 11, further comprising:
displaying a carousel interface with icons ordered based on the ranking, the carousel interface comprising multiple icons, each icon being user-selectable to display a respective one of the plurality of augmented reality content items with the second image.

14. The method of claim 10, further comprising:
receiving second user input to create a second media content item which includes the smaller version of first media content item and the second image; and
generate, in response to receiving the second user input, the second media content item.

15. The method of claim 10, further comprising:
displaying an animation which resizes first media content item to the smaller version of first media content item.

16. The method of claim 10, wherein display of first media content item within the first user interface is subject to one or more restrictions, and
wherein displaying the smaller version of first media content item conforms with the one or more restrictions.

17. The method of claim 16, wherein the one or more restrictions comprise a time-based restriction which limits display of the smaller version of the first media content item to a predefined time period.

18. The method of claim 16, wherein the one or more restrictions comprise a sharing restriction which restricts sharing of the second media content item.

19. A non-transitory computer-readable storage medium, the computer-readable storage medium including instructions that when executed by a computer, cause the computer to perform operations comprising:

displaying, within a messaging application running on a first device associated with a first user, a first user interface in which a camera of the first device is deactivated, the first user interface corresponding to a message preview for previewing a first media content item prior to saving the first media content item, the first media content item including a first image captured by the first device;

receiving user input via the first user interface, the user input corresponding to a pinch gesture; and in response to receiving the user input, activating the camera to capture a second image in real-time, and displaying a second user interface which replaces the first user interface, the second user interface for generating a second media content item for display in the second user interface and for sending to a second user, the second media content item including the second image and a smaller version of the first media content item as a sticker overlaying the second image, wherein the first user interface includes editing tools for modifying and annotating the first media content item prior to saving the first media content item.

* * * * *